United States Patent
Park et al.

(10) Patent No.: US 8,568,598 B2
(45) Date of Patent: Oct. 29, 2013

(54) TIP TYPE PROBE MANUFACTURING METHOD, TIP TYPE PROBE AND TIP TYPE PROBE MANUFACTURING APPARATUS

(75) Inventors: Majung Park, Chiba (JP); Manabu Oumi, Chiba (JP)

(73) Assignee: Seiko Instruments Inc. (JP)

( * ) Notice: Subject to any disclaimer, the term of this patent is extended or adjusted under 35 U.S.C. 154(b) by 321 days.

(21) Appl. No.: 12/735,789

(22) PCT Filed: Feb. 18, 2009

(86) PCT No.: PCT/JP2009/052733
§ 371 (c)(1),
(2), (4) Date: Oct. 12, 2010

(87) PCT Pub. No.: WO2009/104625
PCT Pub. Date: Aug. 27, 2009

(65) Prior Publication Data
US 2011/0024387 A1     Feb. 3, 2011

(30) Foreign Application Priority Data
Feb. 21, 2008   (JP) ................................ 2008-039862

(51) Int. Cl.
    *C23F 1/00*        (2006.01)
    *G11B 5/127*     (2006.01)
    *H04R 31/00*     (2006.01)
    *H01L 21/20*      (2006.01)
    *H01L 21/311*    (2006.01)

(52) U.S. Cl.
    USPC ...... 216/2; 29/603.01; 29/603.07; 29/603.13; 216/24; 438/40; 438/584; 438/694; 438/696

(58) Field of Classification Search
    USPC ........... 29/603.01, 603.07, 603.13; 216/2, 24; 427/62, 250, 306, 307; 438/22, 40, 438/584, 689, 694, 696
See application file for complete search history.

(56) References Cited

U.S. PATENT DOCUMENTS

| | | | |
|---|---|---|---|
| 2001/0011704 A1 * | 8/2001 | Niwa et al. | 250/310 |
| 2006/0153058 A1 * | 7/2006 | Takahashi et al. | 369/300 |
| 2006/0261177 A1 * | 11/2006 | Hirata et al. | 239/1 |
| 2009/0208641 A1 * | 8/2009 | Harata et al. | 427/127 |

FOREIGN PATENT DOCUMENTS

| | | | |
|---|---|---|---|
| JP | 2003272214 A | * | 9/2003 |
| WO | WO 2008015865 A1 | * | 2/2008 |

OTHER PUBLICATIONS

Patent Abstracts of Japan, Publication No. 2001-208672, Publication Date Aug. 3, 2001.
Patent Abstracts of Japan, Publication No. 2006-329968, Publication Date Dec. 7, 2006.
Abstract, Publication No. WO/2008/015865, Publication Date Feb. 7, 2008.

* cited by examiner

*Primary Examiner* — Allan Olsen
*Assistant Examiner* — Margaret D Klunk
(74) *Attorney, Agent, or Firm* — Adams & Wilks (57) ABSTRACT

A manufacturing method of a tip type probe includes the steps of: forming on a substrate an etching mask of a shape similar to a shape of a top surface of a truncated pyramid; forming the truncated pyramid by subjecting the substrate to isotropic etching using the etching mask as a mask member; stopping the isotropic etching when an area of the top surface reaches an area capable of generating near-field light; and forming a metal film on at least some of the side surfaces of the truncated pyramid by allowing film forming particles to enter into a space between the etching mask and the side surfaces and adhere onto the truncated pyramid. The directivity of the film forming particles is controlled so that the metal film has a thickness that is reduced gradually from a bottom of the truncated pyramid toward the top surface.

11 Claims, 5 Drawing Sheets

TIP TYPE PROBE MANUFACTURING METHOD, TIP TYPE PROBE AND TIP TYPE PROBE MANUFACTURING APPARATUS

Cross-Reference to Related Applications

This application is a U.S. national stage application of International Application No. PCT/JP2009/052733 filed Feb. 18, 2009, claiming a priority date of Feb. 21, 2008, and published in a non-English language.

TECHNICAL FIELD

The present invention relates to a tip type probe manufacturing method, a tip type probe, and a tip type probe manufacturing apparatus.

BACKGROUND ART

A tip type probe finds widespread applications as an element for a variety of devices by forming different types of metal films having functionality on the side surfaces thereof.

For example, by forming a metal film having a light-shielding function of shielding light having a predetermined wavelength on the top surface, a tip type probe is used as an element that generates near-field light on the top surface. Also, by forming a magnetic material or both a metal film having a light-shielding function and a magnetic material on the side surfaces, a tip type probe can be used as an element for magnetic recording or near-field light assisted magnetic recording.

A near-field light generating element is used for an optical head in an optical recording apparatus that performs high-density information recording and reproduction or an optical probe in a near-field optical microscope used for high-resolution observation. Because of the capability of handling optical information in a microscopic region exceeding the diffraction limit of light, the near-field optical technique is expected to attain high recording density and resolution unachievable with the optical technique in the related art.

A main issue of the near-field light generating element is to obtain a microscopic and strong spot of near-field light. Several shapes have been already proposed for this issue. Patent Document 1 describes the structure in which the contour shape of an optical aperture provided at the tip end of a near-field light generating element is made triangular and a polarization direction of incident light is perpendicular to one side of the triangle, so that localized strong near-field light is generated on this one side (triangular aperture method). According to Patent Documents 2 and 3 and Non-Patent Document 1, metal films are formed on two opposing surfaces among four side surfaces of a truncated square pyramid, the two surfaces have a gap not greater than the wavelength of light in the vicinity of the apex of the truncated square pyramid, and each of the metal films on the two surfaces has an apex having a curvature radius of several tens nm or less in the gap portion, so that localized strong near-field light is generated in the gap portion (bow-tie antenna method).

Meanwhile, a tip type probe has been studied in recent years as a recording and reproducing probe in an information recording apparatus. With an increase of a capacity of a hard disc or the like in a computer device, an information recording density within a single recording surface is increasing. For example, it is necessary to increase a surface recording density in order to increase a recording capacity per unit area of a magnetic disc. However, a recording area occupied by information per bit on a recording medium becomes smaller as the recording density becomes higher. When the bit size becomes smaller, energy that 1-bit information has approximates to thermal energy at room temperature. This raises a problem of thermal demagnetization, such as an inversion or a loss of recorded information due to heat fluctuation or the like.

A generally used in-plane recording method is a method of recording magnetism so that the direction of magnetization is oriented in the in-plane direction of a recording medium. This method, however, readily causes a loss of recorded information or the like due to thermal demagnetization as described above. In order to eliminate such an inconvenience, shifting is taking place to a perpendicular recording method by which a magnetization signal is recorded in a direction perpendicular to a recording medium. This method is a method of recording magnetic information by a principle to bring a single magnetic pole close to a recording medium. According to this method, the recording magnetic field is oriented in a direction substantially perpendicular to the recording film. It is easy for information recorded with a perpendicular magnetic field to keep stability in terms of energy because the N pole and the S pole hardly form a loop within the plane of the recording film. The perpendicular recording method is therefore more resistant to thermal demagnetization than the in-plane recording method.

Recording media in recent years, however, are required to have a further higher density to meet a need, such as performing recording and reproduction of a larger volume of information at a higher density. To this end, in order to minimize influences from one magnetic domain to adjacent magnetic domain and vice versa and heat fluctuation, media having a high coercivity are being adopted as recording media. This makes it difficult even for the perpendicular recording method described above to record information into a recording medium.

In order to eliminate this inconvenience, there has been provided a hybrid magnetic recording method (near-field light assisted magnetic recording method) by which writing is carried out while a coercivity is lowered temporarily by locally heating a magnetic domain with near-field light. The hybrid magnetic recording method is a method that utilizes near-field light generated by an interaction between a microscopic region and an optical aperture made in a size not greater than the wavelength of light generated at the near-field optical head.

By utilizing the microscopic optical aperture exceeding the diffraction limit of light, that is, the near-field optical head having a near-field light generating element in this manner, it becomes possible to handle optical information in a region not greater than the wavelength of light that is found to be the limit of the optical system in the related art. The density of the recording bit can be thus increased to the extent exceeding that of the optical information recording and reproduction apparatus in the related art.

Various types are provided as the recording head of the hybrid magnetic recording method described above and one of them is a magnetic recording head configured to increase a recording density by reducing the size of a light spot. For example, there has been proposed a structure by which near-field light is generated by forming a metal thin film of a bow-tie shape on the head bottom surface and irradiating light perpendicularly from above the recording medium, so that near-field light is imposed on a region to which the magnetic field is strongly applied (Patent Document 4). With this near-field light assisted magnetic recording head, the near-field light generating element is a plane film of bow-tie shaped metal formed on the head bottom surface, and near-field light is generated in the gap at the center of the bow-tie by guiding light from a laser via an optical fiber or the like for the light to be reflected on a mirror and irradiated to the bow-tie. Further, because the bow-tie serves also as a magnetic recording element, a medium surface region heated by near-field light coincides with a region magnetized by the magnetic field. A microscopic spot of near-field light can be therefore made as minute as possible to the utmost limit. Hence, this recording head is suitable for high-density recording. Meanwhile, by making the bow-tie structure in a tip shape, not only can a strong recording magnetic field be generated locally while collecting light efficiently, but also the manufacturing method can be simpler. However, a technique of actually manufacturing the tip structure described above has not been put into practical use.

Patent Document 1: JP-A-2001-118543
Patent Document 2: JP-A-11-265520
Patent Document 3: JP-A-2002-221478
Patent Document 4: JP-A-2002-298302 (pp.4-6, FIG. 1)
Non-Patent Document 1: Technical Digest of 6th international conference on near-field optics and related techniques, the Netherlands, Aug. 27-31, 2000, p100

SUMMARY OF THE INVENTION

Problems that the Invention is to Solve

Of the related arts specified above, the manufacturing method of the near-field light generating element by the triangular aperture method of Patent Document 1 has been already disclosed and the element can be manufactured relatively easily. On the contrary, the near-field light generating elements of the bow-tie antenna method of Non-Patent Document 1 and Patent Documents 2 and 3 require a technique of reducing the steps in the fabrication sequence and forming a metal film at a higher degree of accuracy while readily controlling the film thickness. In addition, because processing in the order of several nm to several tens nm is necessary for the apex of the metal film and the shape of the gap portion, an extremely sophisticated microfabrication technique, such as an electron beam lithography system and a focused ion beam system, is generally necessary.

The near-field light assisted magnetic recording head of the structure in the related art described in Patent Document 4 is formed of a plane film provided with a bow-tie formed at the head bottom surface and generating both near-field light and a magnetic field. A generated magnetic field therefore spreads across the entire bow-tie. In the case of longitudinal recording, the gap at the center of the bow-tie regulates recording density and in the case of perpendicular recording, the size of a portion of the main magnetic pole opposing the medium regulates the recording density. When the bow-tie is viewed from the recording medium side, the main magnetic pole is the entire one side of the bow-tie. Hence, the bow-tie itself has to be made minute in order to achieve a high recording density. When the size of the bow-tie is made smaller, the peripheral portion of the bow-tie is included in a spot of incident light. Accordingly, near-field light is generated not only in the center portion of the bow-tie but also in the peripheral portion thereof and recording is carried out erroneously in the peripheral portion of the bow-tie. Also, this recording head does not have the structure capable of generating high-efficient near-field light by collecting propagated light at the center portion of the bow-tie.

As has been described, in order to generate a strong recording magnetic field locally while collecting light efficiently without reducing the size of the bow-tie, there is a need of a structure having the bow-tie at a predetermined angle with respect to recording media, so-called a tip type probe and a manufacturing method thereof.

The invention was devised in view of the foregoing circumstances and has an object to provide a tip type probe manufacturing method and a tip type probe manufacturing apparatus capable of manufacturing a tip type probe having a tip and a bow-tie structure easily with high accuracy at a low cost while achieving a size reduction without the need of a sophisticated microfabrication technique, and a tip type probe manufactured by these method and apparatus. Also, because light can be collected at high efficiency, not only can near-field light be generated efficiently and stably, but also information can be recorded stably at a high density:

Means for Solving the Problems

In order to solve the problems above, a first characteristic of the invention is a tip type probe manufacturing method of manufacturing a tip type probe having a metal film on side surfaces of a truncated pyramid formed of a top surface and the side surfaces and generating a near field from the top surface. The manufacturing method includes the steps of: forming an etching mask of a shape similar to a shape of the top surface on a substrate; forming the truncated pyramid by subjecting the substrate to isotropic etching using the etching mask; stopping the isotropic etching when an area of the top surface reaches an area capable of generating the near field; stopping the isotropic etching; and forming the metal film by allowing film forming particles to round about and enter into a space between the etching mask and the side surfaces for the film forming particles to adhere onto the truncated pyramid.

A second characteristic of the invention is that the truncated pyramid forming step includes effecting isotropic etching from a contour of a contact surface of the etching mask and the substrate.

A third characteristic of the invention is that, by effecting the isotropic etching from the contour of the contact surface of the etching mask and the substrate, an angle of the side surfaces with respect to the top surface changes gradually from the top surface of the truncated pyramid toward a bottom of the truncated pyramid.

A fourth characteristic of the invention is that the manufacturing method further includes the steps of: forming a sacrificial layer in at least a part of the side surfaces; forming the metal film on at least a part of the sacrificial layer and simultaneously forming a rest of the metal film on at least a part of a portion of the side surfaces where the sacrificial layer is not formed; and removing the sacrificial layer and removing the metal film adhering onto the sacrificial layer.

A fifth characteristic of the invention is that a film thickness of the metal film is reduced gradually from a bottom of the truncated pyramid toward the top surface by controlling directivity of the film forming particles with respect to the substrate in the metal film forming step.

A sixth characteristic of the invention is that, by allowing the film forming particles to proceed to the substrate along a direction perpendicular to the substrate from a side of the etching mask opposite to a side where the substrate is disposed, the film thickness of the metal film is reduced gradually from the bottom of the truncated pyramid toward the top surface in the metal film forming step.

A seventh characteristic of the invention is that the metal film formed on at least one of the side surfaces is made of a magnetic material.

An eighth characteristic of the invention is that the metal film formed on at least one of the side surfaces is made of a material having a light-shielding function of shielding light having a predetermined wavelength.

A ninth characteristic of the invention is that the metal film formed on at least one of the side surfaces is made of a material generating a plasmon when irradiated by light having a predetermined wavelength.

A tenth characteristic of the invention is that the metal film formed on at least one of the side surfaces is made of a magnetic material and a film is formed on a rest of the side surfaces using a material having the light-shielding function or a material generating a plasmon when irradiated by light having a predetermined wavelength.

An eleventh characteristic of the invention is that the metal film formed on at least one of the side surfaces is made of a material having a light-shielding function of shielding light having a predetermined wavelength or a material generating a plasmon when irradiated by light having a predetermined wavelength and a film made of a magnetic material is formed on a rest of the side surfaces, the material having the light-shielding function, or the material generating the plasmon.

A twelfth characteristic of the invention is that the tip type probe including a plurality of tip type probes is manufactured on the same substrate using the truncated pyramid forming step and the metal film forming step.

A thirteenth characteristic of the invention is a tip type probe manufactured by the tip type probe manufacturing method according any one of the first through twelfth characteristics.

A fourteenth characteristic of the invention is a tip type probe manufacturing apparatus using the tip type probe manufacturing method according to any one of the first through twelfth characteristics.

A fifteenth characteristic of the invention is a tip type probe manufacturing apparatus that manufactures a tip type probe having a metal film on side surfaces of a truncated pyramid formed of a top surface and the side surfaces and generating a near field from the top surface. The tip type probe manufacturing apparatus includes: a mask placing portion that places an etching mask of a shape similar to a shape of the top surface on a substrate; a truncated pyramid forming portion that forms the truncated pyramid by subjecting the substrate to isotropic etching using the etching mask; an isotropic etching control portion that instructs the truncated pyramid forming portion to stop the isotropic etching when an area of the top surface reaches an area capable of generating the near field; and a metal film forming portion that forms the metal film by allowing film forming particles to round about and enter into a space between the etching mask and the side surfaces for the film forming particles to adhere onto the truncated pyramid.

Advantages of the Invention

According to the invention, a tip type probe can be manufactured easily with high accuracy at a low cost while achieving a size reduction without the need of a sophisticated microfabrication technique. Also, because not only can near-field light and a magnetic field be generated efficiently and stably, but also information can be recorded stably at a high density, it becomes possible to provide a tip type probe with enhanced reliability in handling optical information and writing information.

DETAILED DESCIPTION OF THE INVENTION (First Embodiment)

Hereinafter, a first embodiment of a tip type probe manufacturing method of the invention will be described with reference to FIG. 1 through FIG. 5.

Figure 1:
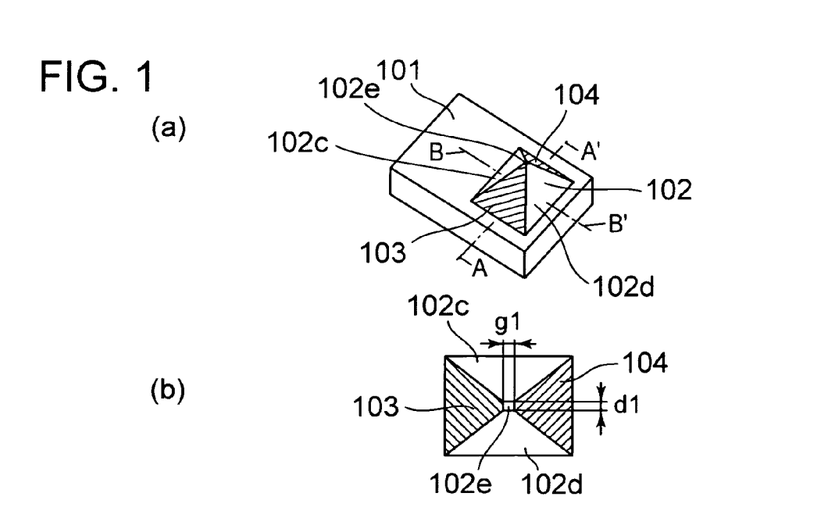
FIG. 1 is a schematic view of a tip type probe according to a first embodiment of the invention.

FIG. 1 schematically shows a tip type probe according to the first embodiment of the invention. FIG. 1A is a perspective view and FIG. 1B is a top view. A truncated square pyramid 102 is placed on an optically transparent substrate 101. The truncated square pyramid 102 has side surfaces 102a (hidden by a metal film 103 and invisible in FIG. 1), 102b (hidden by a metal film 104 and invisible in FIGS. 1), 102c, and 102d, and a top surface 102e. Quartz glass or the like is used as the substrate 101. The side surface 102a and the side surface 102b are disposed oppositely to each other and the side surface 102c and the side surface 102d are also disposed oppositely to each other. The metal film 103 is formed on the side surface 102a and the metal film 104 is formed on the side surface 102b. The metal films 103 and 104 are metal films having predetermined functions (a magnetic material, a material having a light-shielding function of shielding light having a predetermined wavelength, or a material generating a plasmon when irradiated by light having a predetermined wavelength) and each uses a metal film having a film thickness from several nm to several hundreds nm. The metal film 103 and the metal 104 together form a so-called bow-tie antenna.

It may be shaped in such a manner that metal films having the predetermined functions may be formed also on the side surfaces 102c and 102d or metal films having the predetermined functions are formed between the metal films 103 and 104 and the side surfaces 102a and 102b, respectively.

The top surface 102e is a rectangle and let dl be the length of sides in contact with the side surface 102a and the side surface 102b and g1 be the length of sides in contact with the side surface 102c and the side surface 102d. The metal film 103 and the metal film 104 on the side surface 102a and the side surface 102b, respectively, are of a shape sharpened in the vicinity of the top surface 102e and dl represents the sharpness. Also, the metal film 103 and the metal film 104 have a clearance in the vicinity of the top surface 102e and g1 represents the size thereof. Each of dl and g1 has a value from several nm to several hundreds nm.

Figure 2:
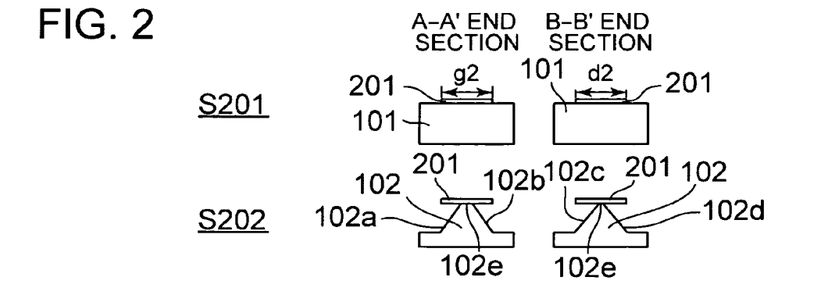
FIG. 2 is a cross section showing a manufacturing method of a truncated square pyramid of the tip type probe according to the first embodiment of the invention.

FIG. 2 is a cross section showing the manufacturing method of the truncated square pyramid 102 of the tip type probe according to the first embodiment of the invention. A cross section taken on line A-A' traversing the side surface 102a, the side surface 102b, and the top surface 102e of FIG. 1 is shown on the left of FIG. 2 and a cross section taken on line B-B' traversing the side surface 102c, the side surface 102d, and the top surface 102e is shown on the right of FIG. 2.

Initially, as is shown in Step S201, an etching mask 201 is formed on the upper surface of the substrate 101. The etching mask 201 is a photoresist thin film processed by photolithography. The etching mask 201 is a rectangle and the length of two sides is g2 and the length of the remaining two sides is d2.

Subsequently, as is shown in Step S202, etching of the substrate 101 is carried out. Etching can be either wet etching or dry etching but it has to be isotropic etching. For example, when the substrate 101 is made of quartz glass, wet etching using a hydrofluoric acid solution is recommendable. By the etching of the substrate 101, the truncated square pyramid 102 of a tip type is formed under the etching mask 201.

It is important herein that a ratio of d1 and g1 is equal to a ratio of d2 and g2 representing the lengths of the sides of the etching mask 201. Hence, by adjusting an aspect ratio of the etching mask 201 and an etching amount of the substrate 101, it becomes possible to control the dimensions of the respective d1 and g1.

Timing at which to stop isotropic etching is as follows: (1) isotropic etching is stopped when a time over which isotropic etching is carried out reaches an etching time determined for the dimensions of the top surface; (2) isotropic etching is stopped when an amount of light having passed through the etching mask reaches a predetermined amount, and so forth.

Figure 3:
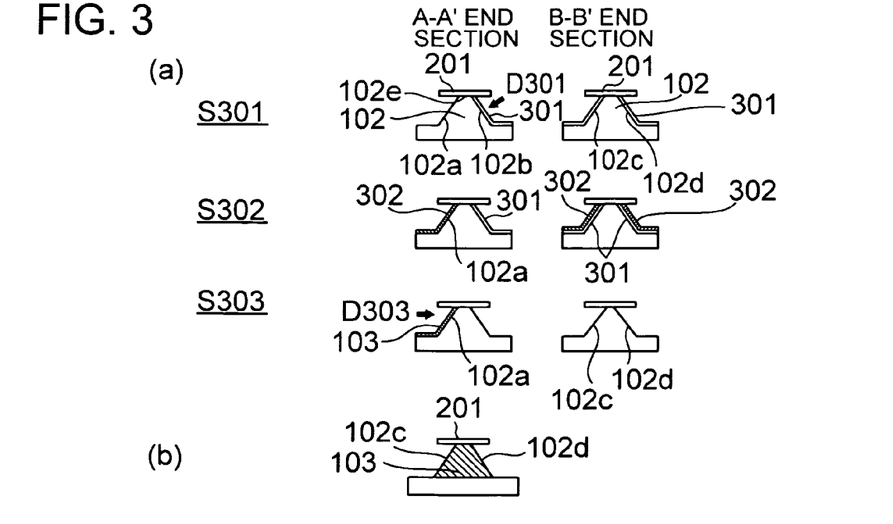
FIG. 3 is an end view showing a method of forming a metal film on the side surface of the truncated square pyramid according to the first embodiment of the invention.
Figure 4:
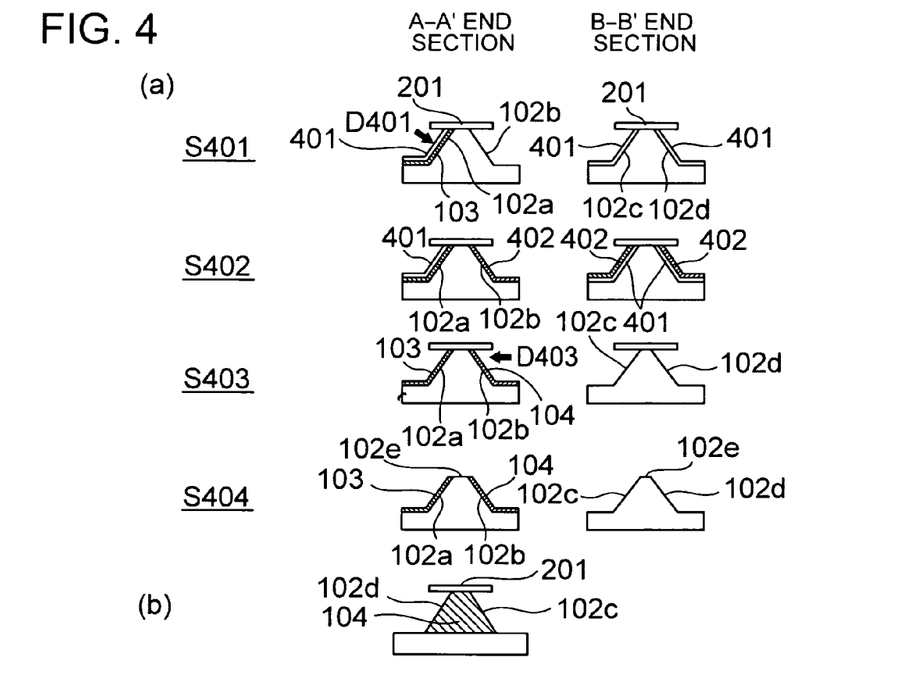
FIG. 4 is an end view showing a method of forming a metal film on the side surface of the truncated square pyramid according to the first embodiment of the invention.
Figure 5:
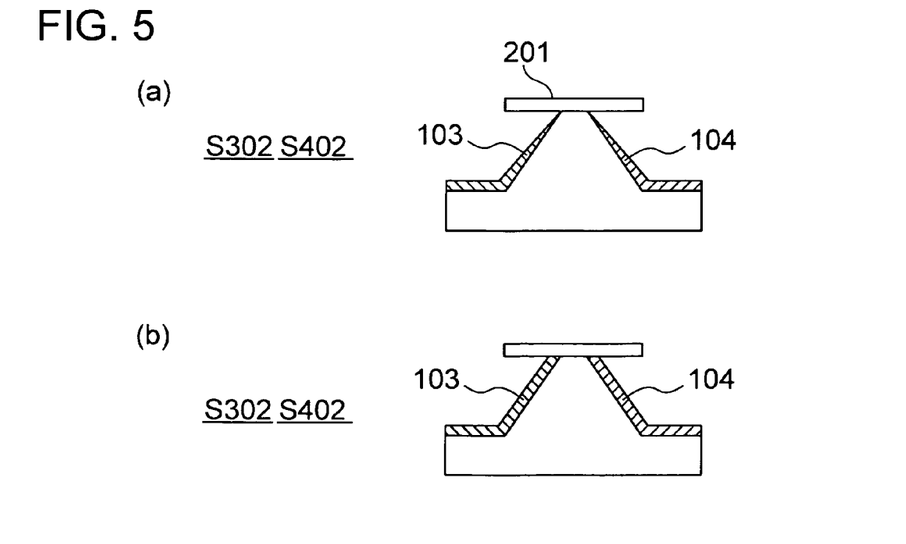
FIG. 5 is a cross section showing that the film thickness of the metal films formed on the side surfaces of the truncated square pyramid according to the first embodiment of the invention is reduced gradually.

FIG. 3 and FIG. 4 are end views respectively showing methods of forming the metal films 103 and 104, respectively, on the side surfaces 102a and 102b of the truncated square pyramid 102.

FIG. 3A is a cross section showing the method of forming the metal film 103 on the side surface 102a of the truncated square pyramid 102 and FIG. 3B is a side view in a direction D303 in S303 of FIG. 3A.

Also, FIG. 4A is a cross section showing the method of forming the metal film 104 on the side surface 102b of the truncated square pyramid 102 and FIG. 4B is a side view in a direction D403 in S403 of FIG. 4A.

Initially, as in Step S301, a sacrificial layer 301 is formed on the side surface 102b using a resin film forming method having directivity, such as the spray coating method, which is applied from a direction D301 perpendicular to the side surface 102b while the etching mask 201 is on the top surface 102e. In this instance, the sacrificial layer 301 is formed not only on the side surface 102b but also on the side surface 102c and the side surface 102d both adjacent to the side surface 102b. The sacrificial layer 301 is not formed on the side surface 102a opposing the side surface 102b because it is hidden behind the side surface 102b due to the directivity of the film forming method. The sacrificial layer 301 is formed of a resin film made of photoresist or the like and has a film thickness from several tens nm to several μm. The sacrificial layer 301 may be a metal film formed by the vacuum vapor deposition method having directivity.

Subsequently, as is shown in Step S302, a metal film 302 is formed on the side surface 102a using a film forming method capable controlling the directivity with respect to the substrate 101, such as the sputtering method. In this instance, the metal film 302 is formed not only on the side surface 102a but also on the sacrificial layer 301 on the side surfaces 102c and 102d.

Subsequently, as is shown in Step S303, the sacrificial layer 301 is lifted off using an organic solvent, such as acetone. Herein, the sacrificial layer 301 can be readily peeled off with addition of ultrasonic waves. In this instance, the metal film 302 on the sacrificial layer 301 is also peeled off. It thus becomes possible to form the metal film 103 on the side surface 102a. In a case where the sacrificial layer 301 made of metal is used, because it can be lifted off using an etchant for the metal, it is also possible to form the metal film 103 on the side surface 102a in the same manner.

Subsequently, as is shown in Step S401 of FIG. 4, a sacrificial layer 401 is formed on the metal film 103 using a photoresist forming method having directivity, such as the spray coating method, which is applied in a direction D401 perpendicular to the side surface 102a. In this instance, the sacrificial layer 401 is formed not only on the metal film 103 but also on the side surface 102c and the side surface 102d. The sacrificial layer 401 is not formed on the side surface 102b opposing the side surface 102a because it is hidden behind the side surface 102a due to the directivity of the film forming method. The sacrificial layer 401 is made of photoresist and has a film thickness from several tens nm to several The sacrificial layer 401 may be a metal film formed by the vacuum vapor deposition method having directivity.

Subsequently, as is shown in Step S402, a metal film 402 is formed on the side surface 102b using a film forming method capable of controlling the directivity with respect to the substrate 101, such as the sputtering method. In this instance, the metal film 402 is formed not only on the side surface 102b but also on the sacrificial layer 401 on the side surface 102c and the side surface 102d.

Subsequently, as is shown in Step S403, the sacrificial layer 401 is peeled off using an organic solvent, such as acetone. Herein, the sacrificial layer 401 can be readily peeled off with addition of ultrasonic waves. In this instance, the metal film 402 on the sacrificial layer 401 is also peeled off. It thus becomes possible to form the metal film 104 on the side surface 102b. In a case where the sacrificial layer 401 made of metal is used, because it can be lifted off using an etchant for the metal, it is also possible to form the metal film 104 on the side surface 102b in the same manner.

Subsequently, as the last step, the etching mask 201 is removed. By so doing, as is shown in Step S404, the metal films 103 and 104 in the shape of a bow-tie antenna are formed, respectively, on the side surfaces 102a and 102b of the truncated square pyramid 102 of a tip type. To remove the etching mask 201, an organic solvent, such as acetone, fuming nitric acid or the like is used. When the etching mask 201 is removed, the top surface 102e of the truncated square pyramid 102 is exposed. As has been described, the top surface 102e is a rectangle having d1 as the length of one side and g1 as the length of another side orthogonal to the one side.

Herein, in a case where the film forming method capable of controlling the directivity, such as the sputtering method, is used while the etching mask 201 is on the top surface 102e, as is shown in FIG. 5A, it becomes possible to process the metal film 103 or 104 in such a manner that the film thickness is reduced gradually in a direction toward the top surface 102e of the truncated pyramid. In the film forming steps of the metal films 103 and 104 carried out in S302 of FIGS. 3 and S402 of FIG. 4, respectively, the directivity of particles during film formation of the metal film 103 or 104 with respect to the substrate 101 is enhanced. In other words, straightness of particles is enhanced by allowing the particles to proceed to the substrate 101 along a direction perpendicular to the substrate 101 from the side of the etching mask 201 opposite to the side where the substrate 101 is disposed. Accordingly, because the round-about performance of the film forming particles entering into a space between the etching mask 201 and the side surface 102a or 102b is lowered, the metal film 103 or 104 can be thinned gradually. Conversely, as is shown in FIG. 5B, the directivity of particles forming the metal films 103 and 104 with respect to the substrate 101 is lowered. That is, the straightness of the particles is weakened. The round-about performance of the film forming particles entering into a space between the etching mask 201 and the side surface 102a or 102b is therefore increased. Then, it becomes possible to form the metal film 103 or 104 having substantially the same film thickness in a direction toward the top surface 102e of the truncated pyramid.

Herein, the method of enhancing the directivity of particles includes: (1) shortening a distance between a target (not shown) from which film forming particles are released by sputtering and the substrate 101; (2) lowering a sputter voltage applied to a target (not shown): (3) lowering a pressure of a noble gas, such as Ar, used for the sputtering, etc. Any one of (1) through (3) may be used or any combination of (1) through (3) may be used.

In the processing methods of the truncated square pyramid 102 described above, by changing merely the shape of the etching mask 201, it becomes possible to form a triangular truncated pyramid, a polyangular truncated pyramid, or a truncated circular cone. It is also possible to form a metal film on the side surface(s) of a truncated triangular pyramid, a truncated polyangular pyramid, or a truncated circular cone using a method similar to the method of processing the metal films 103 and 104.

In the case of using the processing method of forming the metal films 103 and 104 by forming the sacrificial layers 301 and 401 and the metal films 302 and 402 while the etching mask 201 is on the top surface 102e, the metal films 103 and 104 can be formed directly after the truncated square pyramid 102 is processed. Accordingly, the processing efficiency can be enhanced because the number of steps for processing is reduced by eliminating the step of forming the etching mask on the top surface 102e during the film formation of the metal films 103 and 104 by carrying out resist patterning again as in the related art. This processing method is therefore suitable for large-scale production and mass production.

In a case as in the related art where the etching mask 201 is not on the top surface 102e, the metal films 302 and 402 are formed also on the top surface 102e. Hence, even when the metal films 302 and 402 are removed by lift-off, the metal films 302 and 402 are not lifted off completely in the vicinity of the top surface 102e and a residuum is left. On the contrary, because the metal films 302 and 402 are not formed on the top surface 102e in a state where the etching mask 201 is on the top surface 102e, the residuum is not left in the vicinity of the top surface 102e after the lift-off. The need to remove the residuum using a method, such as FIB (Focused Ion Beam) and polishing, is therefore eliminated and the processing efficiency is enhanced. This processing method is therefore suitable for large-scale production and mass production.

In a case where the tip type probe formed by this processing method is used as a near-field light generating element, it is recommendable that the metal films 103 and 104 are made of a material having a light-shielding function of shielding light having a predetermined wavelength or a material generating a plasmon when irradiated by light having a predetermined wavelength. Also, because the top surface 102e without adhesion of the residuum or the like can be obtained, an S-to-N ratio is enhanced, which in turn enhances the generation efficiency of near-field light generated on the top surface 102e. It thus becomes possible to manufacture a near-field light generating element achieving high efficiency and high resolution. Also, in a case where the tip type probe is used as a probe for hybrid magnetic recording, not only does it become possible to enhance the generation efficiency of near-field light, but it also becomes possible to exactly control a distance of the clearance between the metal films 103 and 104 that are to serve as the magnetic poles. Consequently, generation efficiency of the recording magnetic field can be enhanced. Also, because a distance (levitation height) between recording media and the probe can be shortened further or controlled at a higher degree of accuracy, high-density magnetic recording is enabled.

Also, in a case where the metal film 103 or 104 is used as the main magnetic pole, the film thickness of the metal film can be reduced gradually in a direction toward the top surface 102e of the truncated pyramid by carrying out the film forming step only once. It thus becomes possible to reduce a film thickness of the metal films in the vicinity of the top surface 102e to a range from several nm to several tens nm easily without using an extremely sophisticated processing method, such as FIB (Focused Ion Beam). This processing method is therefore suitable for large-scale production and mass production. In addition, because it becomes possible to generate a strong and microscopic recording magnetic field spot in the vicinity of the top surface 102e, the tip type probe is suitable as a probe for high-density magnetic recording.

(Second Embodiment)

A second embodiment of the tip type probe manufacturing method of the invention will now be described with reference to FIG. 6 and FIG. 7. In the second embodiment, like components are labeled with like reference numerals with respect to the first embodiment above and a description thereof is omitted.

Figure 6:
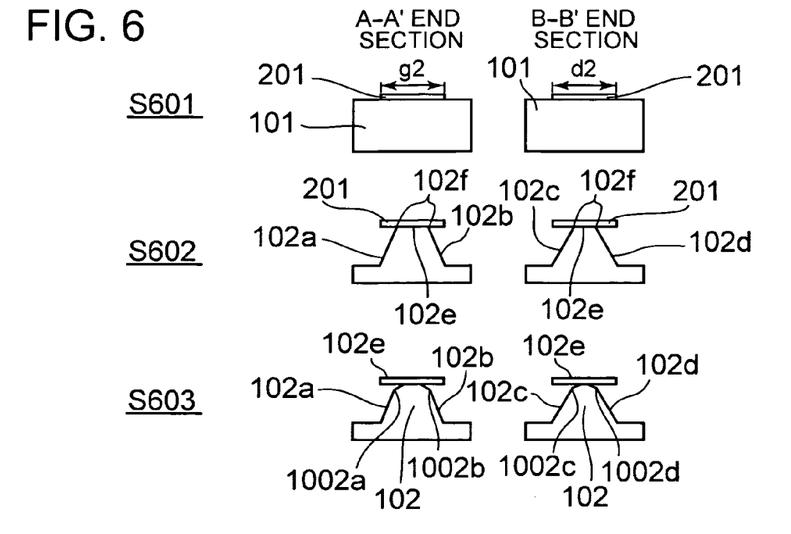
FIG. 6 is a cross section showing a manufacturing method of a truncated square pyramid 102 of a tip type probe according to a second embodiment of the invention.

FIG. 6 is a cross section showing a manufacturing method of a truncated square pyramid 102 of a tip type probe according to the second embodiment of the invention. A cross section taken on line A-A' traversing the side surface 102a, the side surface 102b, and the top surface 102e of FIG. 1 is shown on the left of FIG. 6 and a cross section taken on line B-B' traversing the side surface 102c, the side surface 102d, and the top surface 102e is shown on the right of FIG. 6.

Initially, the structures shown in Steps S601 and S602 can be processed using a method (a method of carrying out isotropic etching using a hydrofluoric acid solution) same as the manufacturing method of the structures shown in S201 and S202 of FIG. 3. Thereafter, by allowing the isotropic etching to proceed while changing the concentration of the hydrofluoric acid solution, it becomes possible to process the truncated square pyramid 102, as shown in S603, having new side surfaces 1002a, 1002b, 1002c, and 1002d, which are obtained from the side surfaces 102a and 102b by changing the angle. The side surfaces 1002a, 1002b, 1002c, and 1002d are formed as the hydrofluoric acid solution having a changed concentration penetrates into the substrate from the contour 102f of the contact surface (top surface 102e) of the etching mask 201 and the substrate.

A buffer hydrofluoric acid solution (BHF) mixed with ammonium fluoride can be used as the hydrofluoric acid solution, and the hydrofluoric acid solution having a changed concentration is capable of readily forming the side surfaces

1002*a*, 1002*b*, 1002*c*, and 1002*d* by using a solution in which the mixing ratio of ammonium fluoride in the solution is increased.

By so doing, the tip type truncated square pyramid 102 having the side surfaces at different angles is formed under the etching mask 201.

Figure 7:
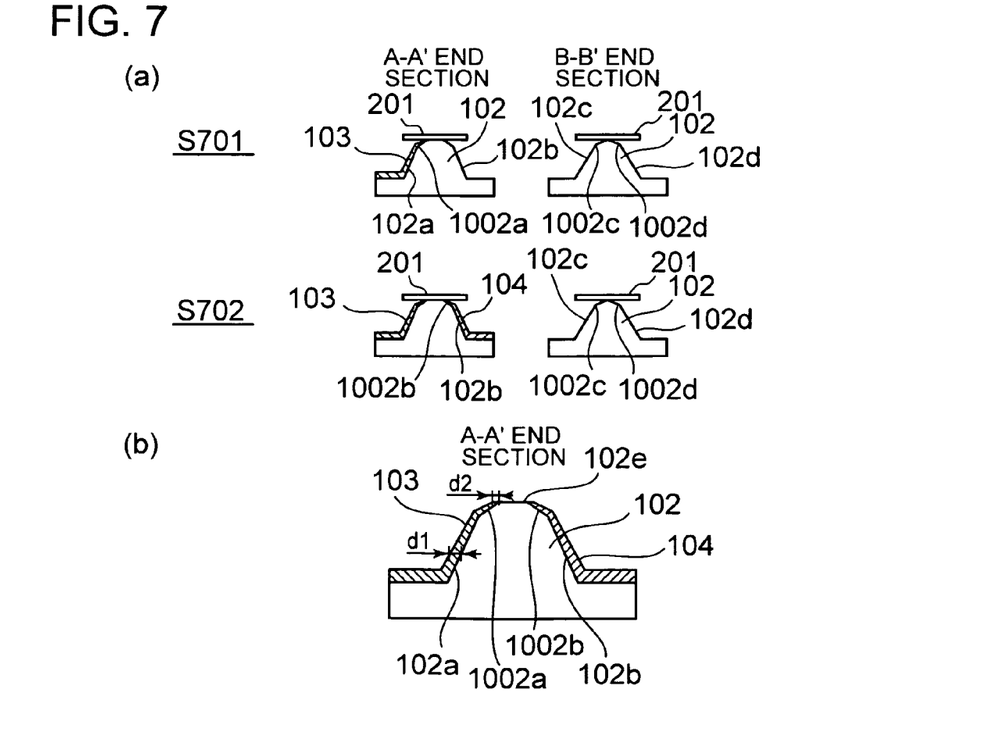
FIG. 7 is a cross section showing a method of forming metal films on the side surfaces of a truncated square pyramid having an angle that changes gradually.

FIG. 7 is a cross section showing a method of forming the metal films 103 and 104 on the side surfaces 102*a*, 1002*a*, 102*b*, and 1002*b* of the truncated square pyramid 102. FIG. 7A is a cross section showing the structure in which the metal film 103 is formed on the side surfaces 102*a* and 1002*a* of the truncated square pyramid 102. For the metal film 103 in S701, a method same as the film forming method used in S301 through S303 of FIG. 3A is used. By controlling the directivity of film forming particles of the metal film 103, the metal film 103 can be readily formed not only on the side surface 102*a* but also on the side surface 1002*a* as the film forming particles round about and enter also into a space between the etching mask 201 and the side surface 1002*a*.

Likewise, the metal film 104 in S702 can be formed by the same method as the film forming method of the metal film 103 in S701 described above. In this instance, because the round-about performance of the film forming particles entering into a space between the etching mask 201 and the side surface 1002*a* or 1002*b* is lowered, the film thickness of the metal film on the side surface 1002*a* or 1002*b* is extremely small in comparison with the film thickness of the metal film formed on the side surface 102*a* or 102*b*.

Finally, by removing the etching mask 201, it becomes possible to process a tip type probe, as shown in FIG. 7B, provided with the metal films 103 and 104 in the shape of a bow-tie antenna formed on the side surfaces 102*a*, 1002*a*, 102*b*, and 1002*b* of the truncated square pyramid 102.

Because the metal films 103 and 104 shown in FIG. 7B are formed while the etching mask 201 is on the top surface 102*e*, the film thickness is reduced gradually in a direction toward. the top surface 102*e* of the truncated pyramid 102. It is, however, possible to further increase a change ratio of the film thickness in comparison with the metal films 103 and 104 shown in FIG. 5A. For example, in contrast to the film thickness d1 that is several μm or greater, the film thickness d2 can be as small as several tens nm or smaller.

When arranged in this manner, the tip type probe shown in FIG. 7B has not only functions and advantages same as the functions and advantages of the tip type probe shown in FIGS. 5A and 5B, but also the capability of generating a further stronger and more minute recording magnetic field spot in the vicinity of the top surface 102*e*. The tip type probe is therefore suitable as a probe for high-density magnetic recording.

(Third Embodiment)

A third embodiment of the tip type probe manufacturing method of the invention will now be described with reference to FIG. 8. In the third embodiment, like components are labeled with like reference numerals with respect to the first and second embodiments above and a description thereof is omitted.

Figure 8:
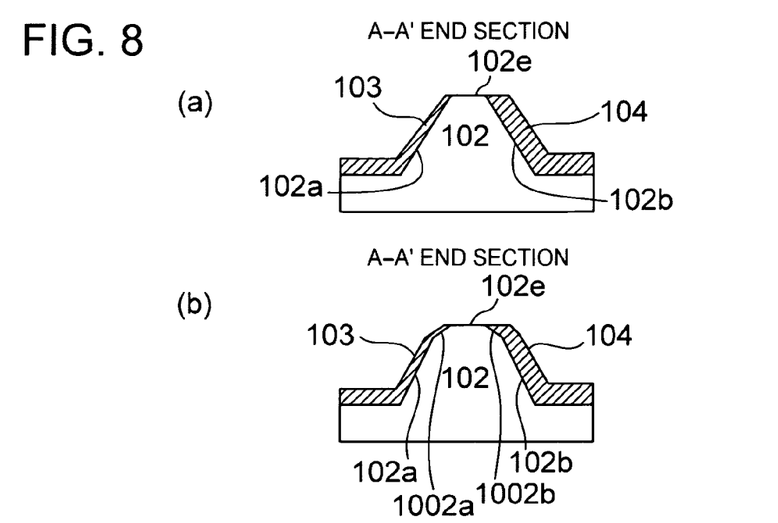
FIG. 8 is a cross section showing various structures of a tip type probe according to a third embodiment of the invention.

FIG. 8 is a cross section of various structures of the tip type probe according to the third embodiment of the invention. The truncated square pyramid 102 and the metal films 103 and 104 shown in FIGS. 8A and 8B can be manufactured by the same method as the manufacturing method of the truncated square pyramid 102 and the truncated square pyramid 102 of the first and second embodiments above. More specifically, the metal films 103 and 104 shown in FIGS. 8A and 8B have different film thicknesses. By using the method of lowering the round-about performance of the film forming particles entering into a space between the etching mask 201 and the respective side surfaces 102*a* and 1002*a* by enhancing the directivity with respect to the substrate 101, which is a method same as the film forming method of the metal films 103 and 104 shown in FIG. 5A and FIG. 7B, it becomes possible to process the metal films 103 shown in FIGS. 8A and 8B in such a manner that the film thickness is reduced gradually in a direction toward the top surface 102*e* of the truncated pyramid 102.

On the contrary, by enhancing the round-about performance of the film forming particles entering into a space between the etching mask 201 and the respective side surfaces 102*b* and 1002*b* by lowering the directivity of the film forming particles with respect to the substrate 101, it becomes possible to form the metal film 104 shown in FIGS. 8A and 8B to have substantially the same film thickness in a direction toward the top surface 102*e* of the truncated pyramid.

In a case where the tip type probes shown in FIGS. 8A and 8B are used as a probe for magnetic recording or hybrid magnetic recording, by using the magnetic film 103 as the main magnetic pole and the magnetic film 104 as the sub-magnetic pole, not only can the tip type probe have advantages and functions same as those of the tip type probes of the first and second embodiments above, but also they can be applied to high-density perpendicular magnetic recording.

(Fourth Embodiment)

A fourth embodiment of the tip type probe manufacturing method of the invention will now be described with reference to FIG. 9. In the fourth embodiment, like components are labeled with like reference numerals with respect to the first through third embodiments above and a description thereof is omitted.

Figure 9:
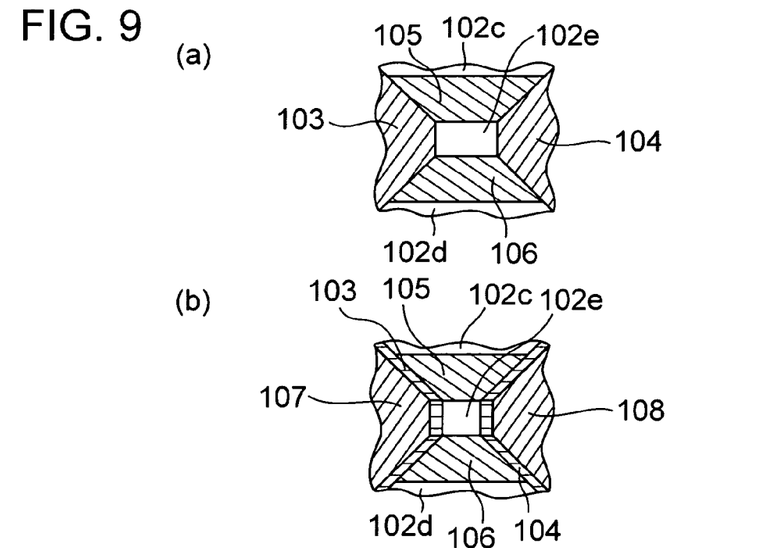
FIG. 9 is a top view showing the top surface of a tip type probe according to a fourth embodiment of the invention and side surfaces in the vicinity thereof.

FIG. 9 is a top view showing the top surface 102*e* of a tip type probe according to the fourth embodiment of the invention and the side surfaces in the vicinity thereof. The truncated square pyramid 102 and all metal films shown in FIGS. 9A and 9B can be manufactured by the same method as the manufacturing method of the truncated square pyramid 102 and the metal films 103 and 104 shown in the first, second, and third embodiments above. More specifically, in addition to the probe structure shown in S404 of FIG. 4 and FIG. 7B, the structure shown in FIG. 9A makes it possible to form metal films 105 and 106, respectively, on the side surfaces 102*c* and 102*d* of the truncated pyramid 102. The forming method of the metal films 105 and 106 is the same as the forming method of the metal films 103 and 104 shown in FIG. 4 and FIG. 7. For example, after the sacrificial layer 301 is formed on the side surface 102*d* and the metal films 103 and 104, a metal film for a specific purpose is formed on the side surface 102*c* as well as the metal films 103 and 104. Subsequently, by carrying out the lift-off by a method same as the methods shown in the first, second, and third embodiments above, it becomes possible to leave the metal film 105 on the side surface 102*c* alone. The forming method of the metal film 106 is the same as the forming method of the metal film 105 described above.

The probe structure shown in FIG. 9 has functions and advantages same as those of the probe structures shown in the first, second, third embodiments above. Also, the characteristic of the probe structure shown in FIG. 9A is that the metal films are formed on all the side surfaces of the truncated square pyramid 102, and by forming all the metal films using a material having a light-shielding function of shielding light having a predetermined wavelength or a material generating a plasmon when irradiated by light having a predetermined wavelength, introduced light is collected further to generate near-field light and a plasmon at high efficiency. A high-efficient near-field light generating probe is thus achieved. Also, by forming the metal films 103 and 104 using a magnetic material and forming the metal films 105 and 106 using a material having the light-shielding function or a material generating a plasmon, the tip type probe can be applied as a probe for high-efficient hybrid magnetic recording.

In addition to the structure shown in FIG. 9A, the characteristic of the probe structure shown in FIG. 9B is that metal films 107 and 108 made of a different material are formed on the metal films 103 and 104, respectively. The forming method thereof is the same as the method of forming the metal films 103 and 104. For example, it is possible to form the metal films 103, 104, 105, and 106 using a material having the light-shielding function or a material generating the plasmon. Alternatively, a combination of the metal films 103 and 104 made of a material having the light-shielding function and the metal films 105 and 106 made of a material generating the plasmon is available. When configured in this manner, in a case where the metal films 107 and 108 are made of a magnetic material, the probe structure shown in FIG. 9B makes it possible to achieve a near-field light generating probe at further higher efficiency. The tip type probe can be therefore applied as a probe for high-efficient hybrid magnetic recording.

(Fifth Embodiment)

A fifth embodiment of the tip type probe manufacturing method of the invention will now be described with reference to FIG. 10. In the fifth embodiments, like components are labeled with like reference numerals with respect to the first through fourth embodiments above and a description thereof is omitted.

Figure 10:
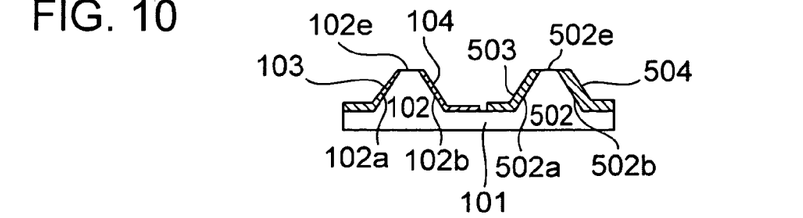
FIG. 10 is an end view showing a tip type probe according to a fifth embodiment of the invention.

FIG. 10 is a cross section of a tip type probe according to the fifth embodiment of the invention. The tip type probe shown in FIG. 10 is of a structure in which a plurality of truncated square pyramids 102 and 502 are processed on the same substrate 101. A processing method of the truncated square pyramids 102 and 502 is the same as the method of processing the truncated square pyramid 102 shown in FIG. 2 or FIG. 6. It should be appreciated, however, that the truncated pyramids 102 and 502 can be formed simultaneously or the truncated pyramids 102 and 502 can be formed separately.

In either case, by using a method same as the forming methods of the metal films shown in the first through fourth embodiments above while the etching mask is on the top surfaces 102*e* and 502*e*, it becomes possible to form a metal film having various structures and functions or combinations.

The probe structure shown in FIG. 10 has functions and advantages same as those of the probe structures shown in the first through fourth embodiments above. Also, the characteristic of the probe structure shown in FIG. 10 is that, by forming the metal films 103 and 104 of the probe formed of the truncated pyramid 102 using a material having the light-shielding function or a material generating the plasmon and forming metal films 503 (main magnetic pole) and 504 (sub-magnetic pole) of the probe formed of the truncated pyramid 502 using a magnetic material, the former and latter probes can be used as a probe in a near-field light generating element and a probe for hybrid magnetic recording, respectively.

Alternatively, by forming the metal film 103 of the probe formed of the truncated pyramid 102 using a magnetic material, forming the metal film 104 using a material having the light-shielding function or a material generating the plasmon, and forming the metal films 503 and 504 of the probe formed of the truncated pyramid 502 using a magnetic material, the probes can be applied also as a probe for hybrid magnetic recording using the metal film 103 as the main magnetic pole and the metal films 503 and 504 as the sub-magnetic pole.

As has been described, by forming a magnetic material, a material having the light-shielding function, and a material generating the plasmon in various combinations on the side surfaces of the truncated pyramid 102 or 502, the tip type probes can be applied as a high-efficient near-field light generating probe or a probe for hybrid magnetic recording.

It should be appreciated that the invention is not limited to the respective embodiments above. To be more specific, the invention may be a tip type probe manufacturing apparatus using the tip type probe manufacturing methods described in the respective embodiments above.

Figure 11:
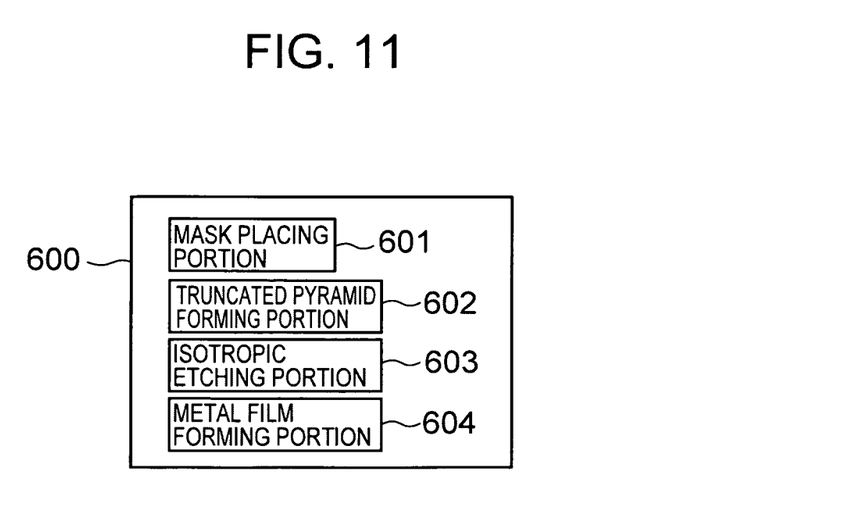
FIG. 11 is a schematic view of a tip type probe manufacturing apparatus according to the fifth embodiment of the invention.

The invention may be applied to a tip type probe manufacturing apparatus provided with the following components. To be more concrete, as is shown in FIG. 11, a tip type probe manufacturing apparatus 600 includes a mask placing portion 601, a truncated pyramid forming portion 602, an isotropic etching control portion 603, and a metal film forming portion 604. The mask placing portion 601 places the etching mask 201 of a shape similar to the shape of the top surface 102*e* on the substrate 101 (see FIG. 2). The truncated pyramid forming portion 602 forms the truncated pyramid 102 by subjecting the substrate 101 to isotropic etching using the etching mask 201 (see FIG. 2). The isotropic etching control portion 603 instructs the truncated forming portion 602 to stop isotropic etching when the area of the top surface 102*e* reaches an area capable of generating a near field (see FIG. 2). The metal film forming portion 604 forms metal films by allowing film forming particles to round about and enter into a space between the etching mask 201 and the side surface 102*a* for the film forming particles to adhere onto the truncated pyramid 102 (see FIG. 3). The mask placing portion 601, the truncated pyramid forming portion 602, the isotropic etching control portion 603, and the metal film forming portion 604 are capable of carrying out the steps described in the respective embodiments above. A description of these steps is, however, omitted because these steps have been described in detail above.

DESCRIPTION OF REFERENCE NUMERALS AND SIGNS

101: substrate
102, 502: truncated square pyramid
102*a*, 1002*a*, 102*b*, 1002*b*: side surface
102*c*, 102*d*, 502*a*, 502*b*: side surface
102*e*, 502*e*: top surface
103, 104, 105, 106, 107, 108: metal film
302, 402, 302*a*, 302*e*: metal film
201: etching mask
301, 401: sacrificial layer
600: tip type probe manufacturing apparatus
601: mask placing portion
602: truncated pyramid forming portion
603: isotropic etching control portion
604: metal film forming portion
d1, d2: film thickness of metal film
D301: direction perpendicular to side surface 102*b*
D303: observation direction of side surface 102*a*
D401: direction perpendicular to side surface 102*a*
D403: observation direction of side surface 102*a*

The invention claimed is:

1. A tip type probe manufacturing method of manufacturing a tip type probe having a metal film on side surfaces of a truncated pyramid having a top surface bounded by the side surfaces and capable of generating near-field light from the top surface, comprising the steps of:

forming an etching mask of a shape similar to a shape of the top surface on a substrate;

forming the truncated pyramid by subjecting the substrate to isotropic etching using the etching mask;

stopping the isotropic etching when an area of the top surface reaches an area capable of generating near-field light; and forming the metal film on at least some of the side surfaces by allowing film forming particles to enter into a space between the etching mask and the side surfaces and adhere onto the truncated pyramid while controlling the directivity of the film forming particles with respect to the substrate so that the metal film adhered to the side surfaces has a thickness that is reduced gradually from a bottom of the truncated pyramid toward the top surface.

2. The tip type probe manufacturing method according to claim 1; wherein the truncated pyramid forming step includes effecting isotropic etching from a contour of a contact surface of the etching mask and the substrate.

3. The tip type probe manufacturing method according to claim 2; wherein by effecting the isotropic etching from the contour of the contact surface of the etching mask and the substrate, an angle of the side surfaces with respect to the top surface changes gradually from the top surface of the truncated pyramid toward a bottom of the truncated pyramid.

4. The tip type probe manufacturing method according to claim 1; further comprising the steps of:

forming a sacrificial layer on at least a part of the side surfaces;

simultaneously forming the metal film on at least a part of the sacrificial layer and on at least a portion of the side surfaces where the sacrificial layer is not formed; and removing the sacrificial layer and removing the metal film adhering onto the sacrificial layer.

5. The tip type probe manufacturing method according to claim 1; wherein the film forming particles proceed to the substrate along a direction perpendicular to the substrate from a side of the etching mask opposite to a side where the substrate is disposed in the metal film forming so that the film thickness of the metal film is reduced gradually from the bottom of the truncated pyramid toward the top surface.

6. The tip type probe manufacturing method according to claim 1; wherein the metal film formed on at least one of the side surfaces is made of a magnetic material.

7. The tip type probe manufacturing method according to claim 1; wherein the metal film formed on at least one of the side surfaces is made of a material having a light-shielding function of shielding light having a predetermined wavelength.

8. The tip type probe manufacturing method according to claim 1; wherein the metal film formed on at least one of the side surfaces is made of a material that generates a plasmon when irradiated by light having a predetermined wavelength.

9. The tip type probe manufacturing method according to claim 1; wherein the metal film formed on at least one of the side surfaces is made of a magnetic material, and a film is formed on the other side surfaces using a material having a light-shielding function of shielding light having predetermined wavelength or a material that generates a plasmon when irradiated by light having a predetermined wavelength.

10. The tip type probe manufacturing method according to claim 1; wherein the metal film formed on at least one of the side surfaces is made of a material having a light-shielding function of shielding light having a predetermined wavelength or a material that generates a plasmon when irradiated by light having a predetermined wavelength, and a film made of a magnetic material is formed on the other side surfaces.

11. The tip type probe manufacturing method according to claim 1; wherein the tip type probe includes a plurality of tip type probes manufactured on the same substrate using the truncated pyramid forming step and the metal film forming step.

* * * * *